(12) United States Patent
Bredeson

(10) Patent No.: US 10,099,651 B2
(45) Date of Patent: Oct. 16, 2018

(54) ERGONOMIC RESTRAINT HARNESS

(71) Applicant: Seth M. Bredeson, Mesa, AZ (US)

(72) Inventor: Seth M. Bredeson, Mesa, AZ (US)

(73) Assignee: DFR Acquisition Corporation, Chandler, AZ (US)

( * ) Notice: Subject to any disclaimer, the term of this patent is extended or adjusted under 35 U.S.C. 154(b) by 211 days.

(21) Appl. No.: 15/015,259

(22) Filed: Feb. 4, 2016

(65) Prior Publication Data

US 2016/0221531 A1  Aug. 4, 2016

Related U.S. Application Data

(60) Provisional application No. 62/111,913, filed on Feb. 4, 2015.

(51) Int. Cl.
*B60R 22/14* (2006.01)
*A47D 15/00* (2006.01)
*B60R 22/10* (2006.01)

(52) U.S. Cl.
CPC ............ *B60R 22/14* (2013.01); *A47D 15/006* (2013.01); *B60R 22/105* (2013.01)

(58) Field of Classification Search
CPC ...... B60R 22/14; B60R 22/105; A47D 15/006
USPC ......................................... 297/484, 465, 468
See application file for complete search history.

(56) References Cited

U.S. PATENT DOCUMENTS

| 4,741,574 A * | 5/1988 | Weightman | B60R 22/00 280/733 |
| 5,108,152 A * | 4/1992 | Reilly | B60N 2/2839 297/397 |
| 7,210,707 B2 * | 5/2007 | Schroth | B60R 22/14 280/801.1 |
| 2015/0298647 A1 * | 10/2015 | Mitsuo | B60N 2/2812 297/256.15 |
| 2015/0335171 A1 * | 11/2015 | Tagle | A47D 13/025 224/160 |

\* cited by examiner

*Primary Examiner* — Syed A Islam
(74) *Attorney, Agent, or Firm* — Barnes & Thornburg, LLP

(57) ABSTRACT

A restraint harness for securing an occupant within a vehicle includes shoulder belts, a lap belt, and a sheath for providing comfort to the occupant.

18 Claims, 5 Drawing Sheets

ERGONOMIC RESTRAINT HARNESS

PRIORITY CLAIM

This non-provisional patent application claims priority to provisional U.S. Patent Application No. 62/111,913, filed Feb. 4, 2015, the contents of which are incorporated herein by reference in their entirety.

TECHNICAL FIELD

The present disclosure relates generally to harnesses, and more particularly to restraint harnesses for vehicles.

BACKGROUND

Harnesses, such as restraint harnesses for vehicles, secure a vehicle occupant against undesirable movement. Restraint harnesses for vehicles such as, for example, four-point harnesses are attached to the vehicle's structure at multiple mounting points and fasten over the occupant to provide a secure fit. A properly secured restraint harness, although providing some protection to the occupant, can be uncomfortable in use.

SUMMARY

The present application discloses one or more of the features recited in the appended claims and/or the following features which, alone or in any combination, may comprise patentable subject matter:

According to one aspect of the disclosure, a restraint harness for securing an occupant within a vehicle may include a lap belt having a first end and a second end, each of the first and second ends being configured for attachment to the vehicle, the lap belt including a buckle positioned between the first and second ends, a pair of shoulder belts that are moveable relative to each other, each shoulder belt having a vehicle end for attachment to the vehicle and extending therefrom to a belt end that is connected to the lap belt, a sheath assembly connected to the lap belt and the pair of shoulder belts, the sheath assembly comprising an upper sheath including a sheath housing defining an interior cavity and padding positioned within the interior cavity, the sheath housing including a neck section having a predetermined length and a pair of arm sections each having a first end attached to opposite ends of the neck section and extending therefrom in a direction parallel to each other to a second end. The sheath housing may be connected to each of the shoulder belts proximate to the neck section to define a maximum spacing between the shoulder belts.

In some embodiments, the maximum spacing may be equal to the predetermined length.

In some embodiments, the upper sheath may include an outer layer overlapping a front side of the sheath housing to define a pocket between the sheath housing and the outer layer for receiving at least one of the pair of shoulder belts therein.

In some embodiments, the pocket may include a first pair of pocket openings arranged for receiving a first one of the pair of shoulder belts therethrough, and a second pair of pocket openings arranged for receiving a second one of the pair of shoulder belts therethrough.

In some embodiments, a first one of the first pair of pocket openings may be disposed proximate to the first end of one of the arm sections, and wherein a first one of the second pair of pocket openings is disposed proximate to the first end of another one of the arm sections.

In some embodiments, the first one of the first pair of pocket openings and the first one of the second pair of pocket openings may be spaced apart from each other at the predetermined length such that the maximum spacing between the shoulder belts at the first one of each pair of pocket openings is equal to the predetermined length.

In some embodiments, a second one of the first pair of pocket openings may be disposed proximate to the second end of the one of the arm sections, and a second one of the second pair of pocket openings is disposed proximate to the second end of the another one of the arm sections.

In some embodiments, the outer layer may be attached to the sheath housing proximate to each of an inner periphery and an outer periphery of the sheath housing to define the pocket for receiving at least one of the pair of shoulder belts.

In some embodiments, the restraint harness may include a number of lower sheaths each including a lower sheath housing that defines an interior cavity and padding positioned within the interior cavity.

In some embodiments, the sheath body may be U-shaped and the neck section of the sheath housing is adapted for contact the occupant's neck.

In some embodiments, the restraint harness may include a torso strap connected at opposite ends thereof to each of the arm sections for securing the occupant's torso, the torso strap including a buckle positioned between the opposite ends thereof.

In some embodiments, each of the arm sections may include an adjustment strap connected thereto and extending along a length between the first and second ends of the respective arm section, and the opposite ends of the torso strap are each adjustably attached along the respective length of different ones of the adjustment straps.

In some embodiments, the torso strap may include elastic material biasing the torso strap to a shortened length, and non-elastic material defining a maximum length of the torso strap.

According to another aspect of the disclosure, a sheath assembly for connection with an occupant restraint harness of a vehicle may include a torso sheath configured to receive a pair of shoulder belts of the restraint harness, the torso sheath including a sheath body defining an interior cavity and padding positioned within the interior cavity, the sheath body including a neck contour having a predetermined length and a pair of arms each having a first end attached to opposite ends of the neck contour and extending therefrom in a direction parallel to each other to a second end, and a number of waist sheaths configured to receive a lap belt of the restraint harness. The sheath body may include an outer cover overlapping a front side of the sheath body to define a closure between the sheath body and the outer layer. The closure may have a pair of first openings disposed at the opposite ends of the neck contour and a pair of second openings each disposed proximate to the second ends of different ones of the arms. The pair of first openings may define a maximum distance therebetween.

In some embodiments, the sheath body may be U-shaped and the neck contour is adapted for contact with the occupant's neck.

In some embodiments, the number of waist sheaths each may include a sheath body that defines an interior cavity and padding positioned within the interior cavity.

In some embodiments, the number of waist sheaths may each have a length defined between an inner end and an outer end, the inner ends each of the number of waist sheath being configured for overlapping engagement with each other, and a height of each of the number of waist sheaths is tapered proximate to the inner and outer ends.

In some embodiments, the restraint harness sheath assembly may include a torso strap connected at opposite ends thereof to each of the arms for securing the occupant's torso, the torso strap includes a buckle positioned between the opposite ends thereof.

In some embodiments, each of the arms may include an adjustment strap connected thereto and extending along a length between the first and second ends of the respective arms, and the opposite ends of the torso strap are each adjustably attached along the respective length of different ones of the adjustment straps.

According to another aspect of the disclosure, a restraint system for securing an occupant within a vehicle may include an occupant seat having at least one opening defined therethrough proximate to the occupant's neck, a lap belt having a first end and a second end, each of the first and second ends being configured for attachment to the vehicle, the lap belt including a buckle positioned between the first and second ends, a pair of shoulder belts that are moveable relative to each other, each shoulder belt having a vehicle end for attachment to the vehicle and extending therefrom through the opening of the occupant seat to a belt end that is connected to the lap belt, a sheath assembly connected to the lap belt and the pair of shoulder belts, the sheath assembly comprising an upper sheath including a sheath housing defining an interior cavity and padding positioned within the interior cavity, the sheath housing including a neck section having a predetermined length and a pair of arm sections each having a first end attached to opposite ends of the neck section and extending therefrom in a direction parallel to each other to a second end. The sheath housing may be connected to each of the shoulder belts proximate to the neck section to define a maximum spacing between the shoulder belts.

Additional features alone or in combination with any other feature(s), including those listed above and those listed in the claims and those described in detail below, can comprise patentable subject matter. Others will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the following figures, in which.

DETAILED DESCRIPTION OF THE DRAWINGS

Figures 1, 2:
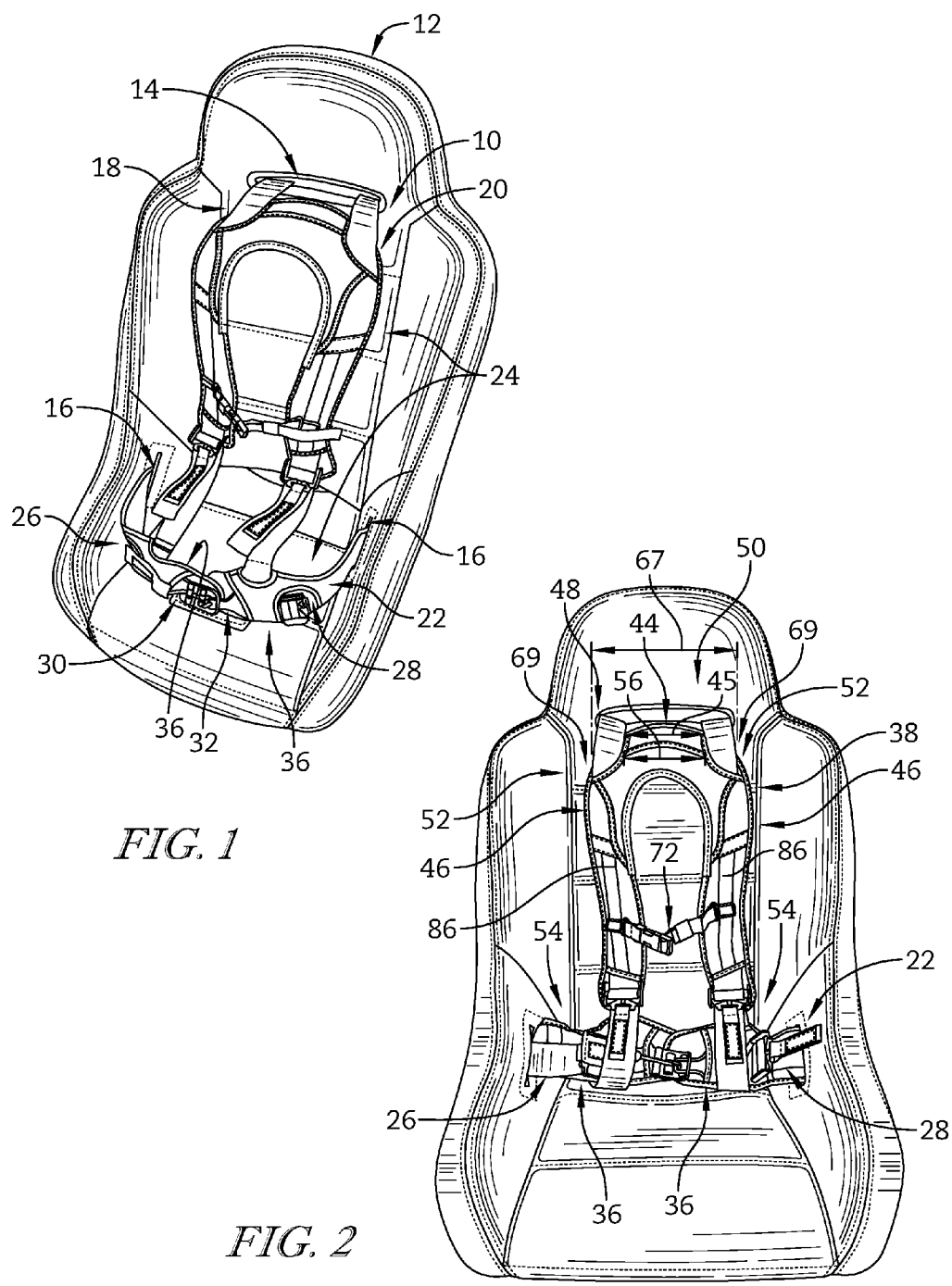
FIG. 1 is a perspective view of an ergonomic restraint harness assembled to a seat of a vehicle.
FIG. 2 is a front elevation view of the restraint harness of FIG. 1.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention.

Harnesses provide protection from undesired body movement in a variety of contexts, for example, in automotive use as a restraint harness to secure an occupant within a vehicle. Safely restraining an occupant can provide discomfort to the occupant. As described herein, controlling the relative movement of belts of the harness and providing soft engagement areas between the occupant's body and the harness can increase the comfort of restraint harnesses.

FIG. 1 shows a restraint harness 10 for securing an occupant within a vehicle. The restraint harness 10 is illustratively attached to the vehicle and assembled to a seat 12 of the vehicle. In the illustrative embodiment, the seat 12 illustratively has openings 14, 16 for receiving the harness 10 therethrough. It should be appreciated that harness 10 may be assembled with vehicle seats that are not equipped with openings 14, 16.

The restraint harness 10 illustratively includes a pair of shoulder belts 18, 20, a lap belt 22 connected to the shoulder belts 18, 20, and a sheath assembly 24 connected to the shoulder belts 18, 20 and the lap belt 22. Each of the shoulder belts 18, 20 illustratively attaches to the vehicle behind the seat 12. Each of the shoulder belts 18, 20 illustratively extends from attachment with the vehicle, through the opening 14 of the seat 12 that is positioned proximate to an occupant's neck, to connection with the lap belt 22. The shoulder belts 18, 20 are illustratively configured to be arranged along the occupant's chest to secure the occupant within the vehicle.

The lap belt 22 illustratively includes belts sections 26, 28 each having a portion of a quick-release buckle 30, 32 for buckling engagement therebetween. Each belt section 26, 28 illustratively extends from attachment with the vehicle behind the seat 12, through a respective one of the openings 14 that is positioned at opposite sides of the seat 12 proximate to an occupant's hips, and laterally across the seat 12 for buckling engagement with the other belt section 26, 28. The belt sections 26, 28 are illustratively configured to be secured across the occupant's waist to secure the occupant within the vehicle.

In the illustrative embodiment, the shoulder belts 18, 20 and the lap belt 22 are generally embodied as belts of a standard four-point restraint harness having a quick-release waist buckle 30, 32 and are illustratively attached to standard harness securing points of the vehicle. It should be appreciated that in some embodiments, the shoulder belts 18, 20 and the lap belt 22 may be configured as any suitable type of restraint harness, for example, a five-point harness.

The sheath assembly 24 is illustratively connected to the shoulder belts 18, 20 and the lap belt 22. The sheath assembly 24 illustratively includes an upper sheath 34 connected to the shoulder belts 18, 20 and a pair of lower sheaths 36 connected to the lap belt 22. The upper sheath 34 connects to each of the shoulder belts 18, 20 to define a maximum spacing 56 therebetween.

Figure 3:
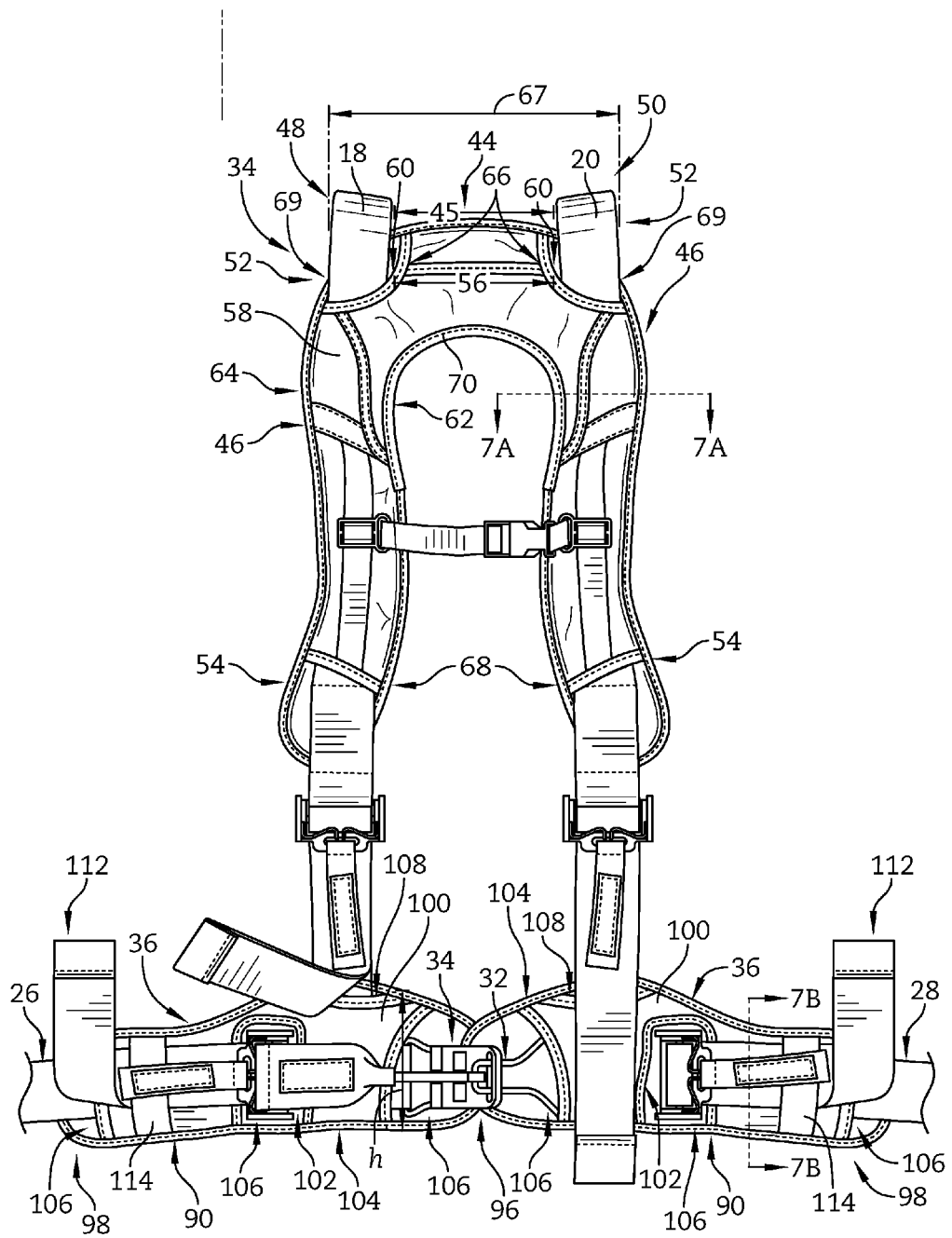
FIG. 3 is another front elevation view of the restraint harness of FIGS. 1 and 2.
Figure 7:
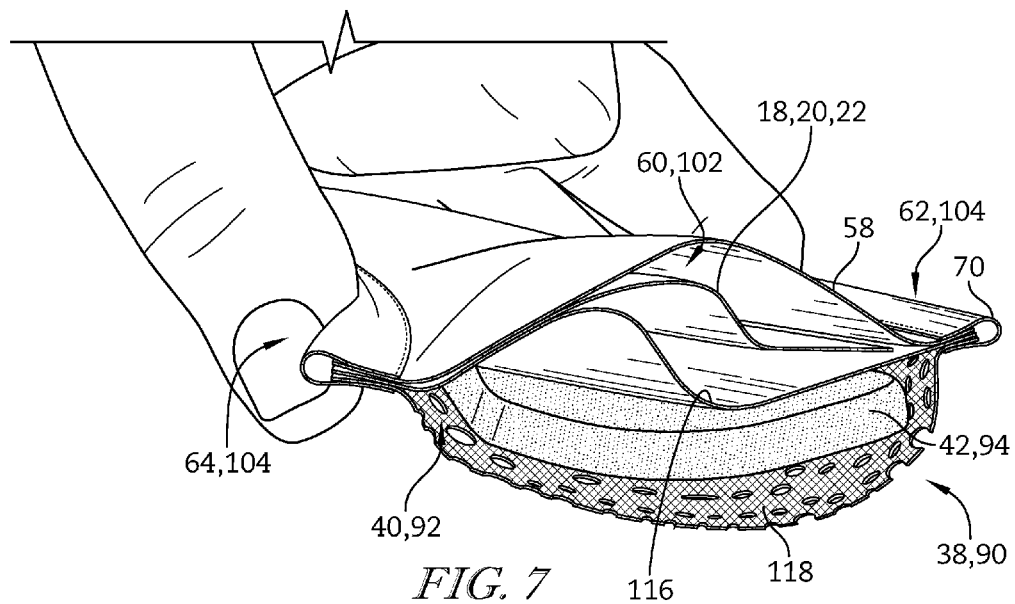
FIG. 7 is a perspective cross-sectional view representative of the restraint harness of FIGS. 1-3 taken along each of the line 7A-7A and the line 7B-7B in FIG. 3.

As shown in FIGS. 3 and 7, the upper sheath 34 illustratively includes a sheath housing 38. As described in additional detail below, the sheath housing 38 includes a cavity 40 defined therein, and padding 42 disposed within the cavity 40. The sheath housing 38 includes a neck section 44 and arm sections 46 connected to opposite ends 48, 50 of the neck section 44. The neck section 44 is illustratively formed of a fabric and supports little compression but can resist significant tension; the neck section 44 illustratively has a predetermined maximum length 45 defined between the opposite ends 48, 50.

Referring to FIG. 2, the arm sections 46 each have an end 52 that is connected to one of the respective ends 48, 50 of the neck section 44. The arm sections 46 illustratively extend in parallel to each other between the end 52 and another end 54 that is proximate to an occupant's abdomen. The sheath housing 38 is illustratively connected to the shoulder belts 18, 20 proximate to the neck section 44 to define a maximum spacing 56 between the shoulder belts 18, 20. By controlling the maximum spacing 56 between the shoulder belts 18, 20 proximate to the occupant's torso, the relative force applied to the occupant by either shoulder belt 18, 20 can be distributed more evenly to the occupant's body, decreasing focus pressure points and increasing comfort. The sheath housing 38 is illustratively formed of a fabric and supports little compression but can resist significant tension without substantial stretch. In the illustrative embodiment, the sheath housing 38 defines the maximum spacing 56 to be equal to the maximum length 45 of the neck section 44.

The shoulder belts 18, 20 are illustratively connected to the sheath housing 38 proximate to the ends 48, 50 of the neck section 44. In the illustrative embodiment, shoulder belt 18 is connected to the sheath housing 38 proximate to the end 48 of the neck section 44 and the shoulder belt 20 is connected to the sheath housing 38 proximate to the end 50 of the neck section 44.

In the illustrative embodiment as shown in FIG. 3, the upper sheath 34 includes a layer 58 that defines a pocket 60 for receiving the shoulder belts 18, 20. The layer 58 is illustratively attached to the outside of a front side of the sheath housing 38 along an inner periphery 62 and an outer periphery 64 of the sheath housing 38 to define the pocket 60 between the sheath housing 38 and the layer 58. The pocket 60 illustratively includes a pair of openings 66 and another pair of openings 68.

In the illustrative embodiment, the shoulder belts 18, 20 are wovenly connected to the sheath housing 38 through the pocket 60. Each opening 66 illustratively receives a respective one of the shoulder belts 18, 20 therethrough. One of the openings 68 is illustratively positioned proximate to the end 54 of each arm sections 46 and each opening 68 receives a respective one of the shoulder belts 18, 20 therethrough. The pocket 60 illustratively extends between the openings 66 and the openings 68 for reception of the shoulder belts 18, 20 therethrough.

In the illustrative embodiment, each shoulder belt 18, 20 is connected to the sheath housing 38 by being threaded through the respective opening 66, pocket 60, and opening 68, without being fixed thereto, such that the sheath housing 38 can slide along the length of the shoulder belts 18, 20. Allowing the sheath housing 38 to slide along the shoulder belts 18, 20 provides good fit to the occupant and reduces friction against the occupant's body.

In the illustrative embodiment, one of the openings 66 is illustratively positioned proximate to one end 48, 50 of the neck section 44 and the other opening 66 is positioned proximate to the other end 48, 50 of the neck section 44. The openings 66 illustratively include outer portions 67 that are spaced apart from each other by a maximum distance 69. The openings 66 respectively receive the shoulder belts 18, 20 therethrough to define the maximum spacing 56 of the shoulder belts 18, 20 proximate to the occupant's torso to be equal to the maximum length 45 of the neck section 44. In the illustrative embodiment, the maximum spacing 56 is equal to the spacing between the shoulder belts 18, 20 as defined by the opening 14 of the seat 12. In some embodiments, the maximum spacing 56 defined by the openings 66 may be any spacing suitable for distributing the forces of the shoulder belts 18, 20 to the occupant's torso more evenly.

The upper sheath 34 illustratively includes edges 70 positioned along the inner periphery 62 that are configured for contact with the occupant's neck. The edges 70 are illustratively made of micro-suede to provide a comfortable contact interface with the occupant's body. In some embodiments, the edges 70 may be formed of any material suitable for contact with the occupant's body. In the illustrative embodiment, the sheath housing 38 has a U-shape, but in some embodiments may have any suitable shape for providing comfort to the occupant.

Figure 4:
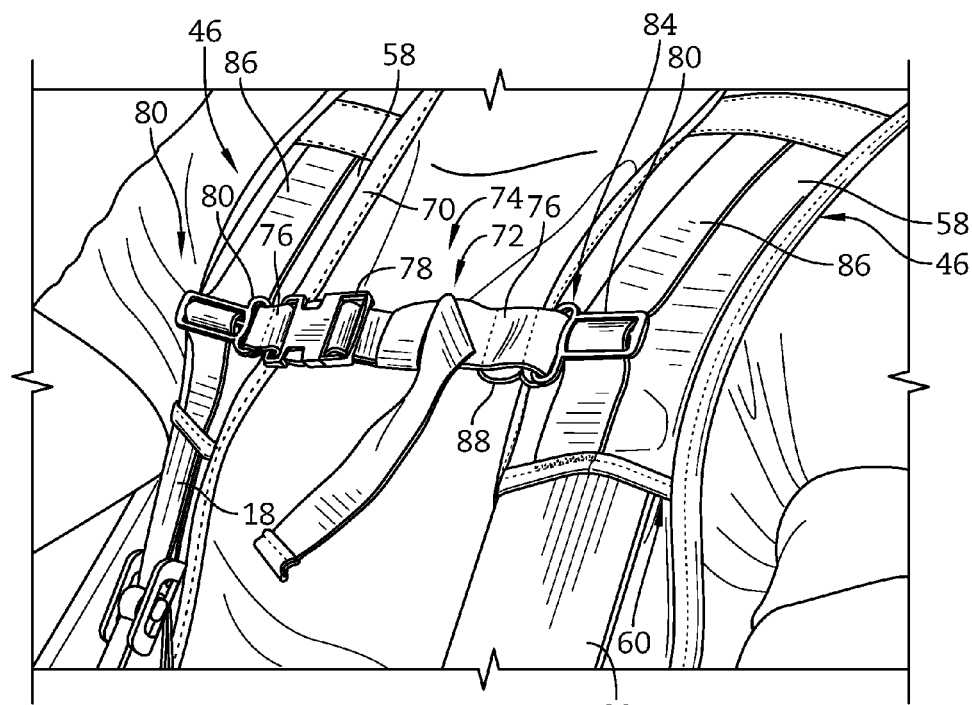
FIG. 4 is a close perspective elevation view of the restraint harness of FIGS. 1-3.

Referring to FIG. 4, a torso strap 72 illustratively secures laterally across the occupant's torso. The torso strap 72 illustratively includes a strap body 74 having two strap sections 76 and a buckle 78 securing the strap sections 76 together. The torso strap 72 illustratively includes slidable attachments 80 at opposite ends 82, 84 thereof, the attachments 80 being slidably connected to each of the arm sections 46, respectively.

An adjustment strap 86 is illustratively attached to and extends between the ends 52, 54 of each of the shoulder belts 18, 20. One of the slidable attachments 80 is illustratively attached to each of the adjustment straps 86 and is slidably positionable along the length of the respective adjustment strap 86. The torso strap 72 is connected to the arm sections 46 to provide vertically adjustable securing of the torso strap 72 laterally across the occupant's torso.

Torso strap 72 illustratively includes an elastic material 88. The elastic material 88 illustratively biases the length of the torsos strap 72 to a shortened length (as shown in FIG. 2) while resiliently permitting the torso strap 72 to be extended to a maximum length (as shown in FIG. 3). The strap sections 76 illustratively define the maximum length and are formed to substantially resist stretching. In the illustrative embodiment, under no load, the elastic material 88 initially biases the torso strap 72 to the shortened length in which no tension is placed on the strap sections 76. When a load is applied, the length of the torso strap 72 increases and the elastic material 88 is stretched. Once the torso strap 72 is extended such that the straps sections 76 are in tension, the maximum length of the torso strap 72 is reached and the torso strap 72 resists additional stretching.

Figure 5:
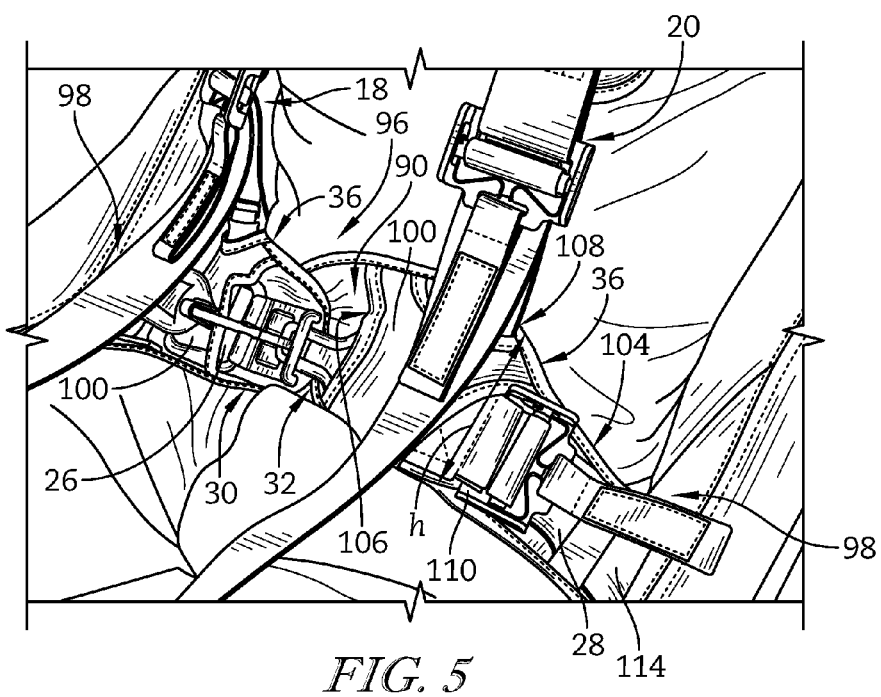
FIG. 5 is another close perspective view of the restraint harness of FIGS. 1-3.
Figure 6:
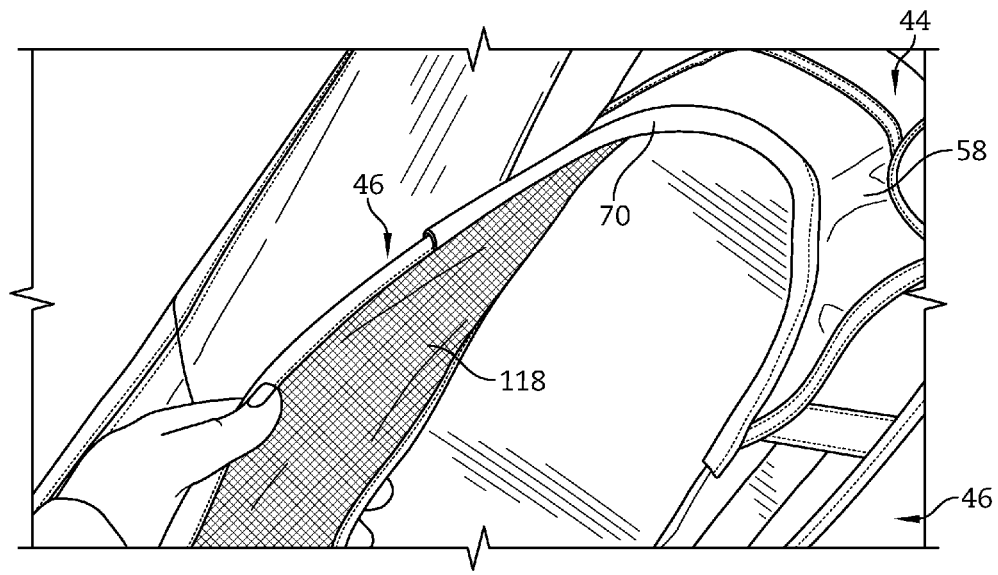
FIG. 6 is another close perspective view of the restraint harness of FIGS. 1-3.

Referring now to FIG. 5, the pair of lower sheaths 36 are shown. As described more detail more, each lower sheath 36 includes a sheath housing 90 defining a cavity 92 therein and including padding 94 within the cavity 92. One of the lower sheaths 36 is connected to each of the belt sections 26, 28 of the lap belt 22.

The sheath housing 90 of each of the lower sheaths 36 extends between an inner end 96 and an outer end 98. Each sheath housing 90 is illustratively shaped to a have a height h that is tapered proximate to each end 96, 98. The lower sheaths 36 are illustratively configured to engage each other by overlap at their inner ends 96.

Referring to FIGS. 3 and 5, the sheath housing 90 of each of the lower sheaths 36 includes a layer 100 that defines a pocket 102 for receiving the lap belt 26. The layer 100 is illustratively attached to the outside of a front side of the sheath housing 90 of each of the lower sheaths 36 along a periphery 104 of the sheath housing 90 to define the pocket 102 between the sheath housing 90 and the layer 100. The pocket 102 of each sheath housing 90 illustratively includes a number of openings 106, 108.

The lap belt 22 is illustratively wovenly connected to the lower sheaths 36. Openings 106 of each of the lower sheaths 36 are configured to receive the respective belt sections 26, 28 therethrough to receive the lap belt 22 within the pockets 102. Openings 108 are illustratively configured to receive a respective one of the shoulder belts 18, 20 therethrough for attachment to a respective one of the belt sections 26, 28 of the lap belt 22.

In the illustrative embodiment, a buckle 110 of each belt section 26, 28 is positioned at one of the openings 106 and is coupled to an end 112 of the respective belt sections 26, 28. The end 112 of each of the belt sections 26, 28 is a free end that is slidably secured to the buckle 110 to permit adjustment of the lap belt 22 to the occupant.

Each lower sheath 36 illustratively includes a belt loop 114 attached to a front side of layer 100 and configured to receive the free end 112 of the respective belt section 26, 28 therethrough to prevent flapping of the free end 112. The belt loop 114 is illustratively attached at the periphery 104 of the respective housing 90 to receive the free end 112 to be threaded between the belt loop 114 and the layer 100.

Referring to FIG. 7, as mentioned above, the sheath housings 38, 90 of each respective upper and lower sheath 34, 36 include the cavity 40, 92 respectively defined therein, and the padding 42, 94 disposed within the respective cavity 40, 92 (as shown in FIG. 7 as a representative cross-section taken along each of the lines 7A-7A and 7B-7B in FIG. 3). The padding 42, 94 within each cavity 40, 92 is illustratively disposed between the respective belt 18, 20, 22 and the body of the occupant to provide cushion therebetween.

The housings 38, 90 of each of the upper and lower sheaths 34, 36 illustratively include a front layer 116 and backing 118 that together define the respective cavity 40, 92. The front layer 116 of each housing 38, 90 is illustratively formed of a woven nylon material. The backing 118 of each housing 38, 90 is illustratively formed of a breathable material such as, for example, a mesh fabric having a number of openings formed therein.

The layers 58, 100 of each housing 38, 90 are illustratively formed of a nylon material and are attached to the periphery 62, 64, 104 of the respective housings 38, 90, generally overlapping the front layer 116 of the housing 38, 90, to define the pockets 60, 102. It should be understood that in some embodiments, the housings 38, 90 of the respective upper and lower sheaths 34, 36 may be formed of any suitable materials and/or the sheaths 34, 36 may be formed of any combination of the same and/or different materials from each other.

Figure 8:
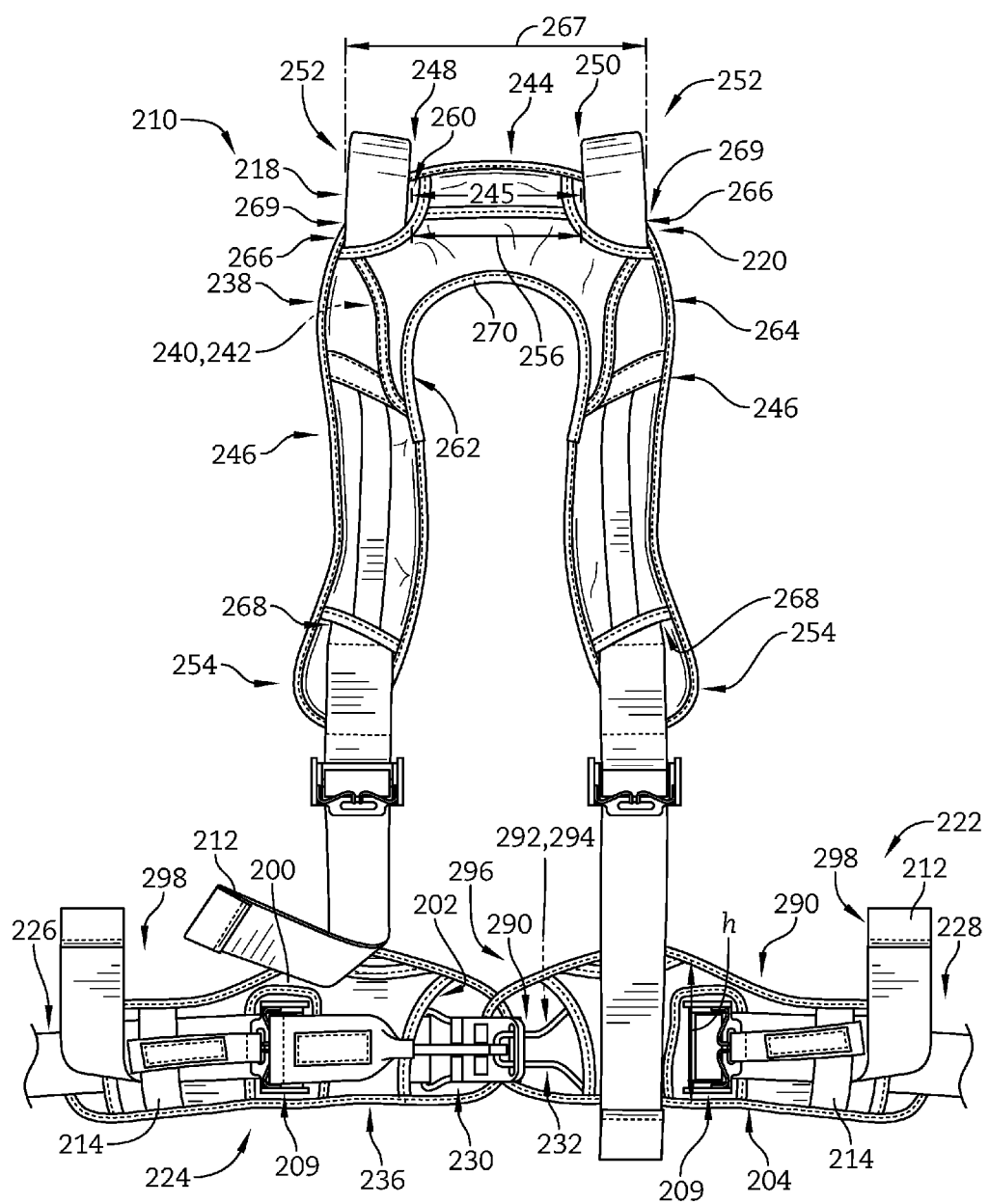
FIG. 8 is front elevation view of another embodiment of an ergonomic restraint harness.

Referring now to FIG. 8, another illustrative embodiment of a restraint harness 210 is shown for securing an occupant within a vehicle. The restraint harness 210 illustratively includes a pair of shoulder belts 218, 220, a lap belt 222 connected to the shoulder belts 218, 220, and a sheath assembly 224 connected to the shoulder belts 218, 220 and the lap belt 222. Each of the shoulder belts 218, 220 illustratively configured to attach to the vehicle behind a seat thereof and to extend from attachment with the vehicle for connection with the lap belt 222. The shoulder belts 218, 220 are illustratively configured to be arranged along the occupant's chest to secure the occupant within the vehicle.

The lap belt 222 illustratively includes belts sections 226, 228 each having a portion of a quick release buckle 230, 232 for buckling engagement therebetween. Each belt section 226, 228 illustratively extends from attachment with the vehicle across the occupant's body proximate to the occupant's hips for buckling engagement with the other belt section 226, 228. The belt sections 226, 228 are illustratively configured to be secured across the occupant's waist to secure the occupant within the vehicle.

In the illustrative embodiment, the shoulder belts 218, 220 and the lap belt 222 are generally embodied as belts of a standard four-point restraint harness having a quick-release waist buckle 230, 232 and are illustratively attached to standard harness securing points of the vehicle. It should be appreciated that in some embodiments, the shoulder belts 218, 220 and the lap belt 222 may be configured as any suitable type of restraint harness, for example, a five-point harness.

The sheath assembly 224 is illustratively connected to the shoulder belts 218, 220 and the lap belt 222. The sheath assembly 224 illustratively includes an upper sheath 234 connected to the shoulder belts 218, 220 and a pair of lower sheaths 236 connected to the lap belt 222. The upper sheath 234 connects to each of the shoulder belts 218, 220 to define a maximum spacing 256 therebetween.

The upper sheath 234 illustratively includes a sheath housing 238. As described in additional detail below, the sheath housing 238 illustratively includes a cavity 240 defined therein, and padding 242 disposed within the cavity 240. The sheath housing 238 includes a neck section 244 and arm sections 246 connected to opposite ends 248, 250 of the neck section 244. The neck section 244 illustratively has a predetermined maximum length 245 defined between the opposite ends 248, 250.

The arm sections 246 each have an end 252 that is connected to one of the respective ends 248, 250 of the neck section 244. The arm sections 246 illustratively extend in parallel to each other between the end 252 and another end 254 that is proximate to an occupant's abdomen. The sheath housing 238 is illustratively connected to the shoulder belts 218, 220 proximate to the neck section 244 to define a maximum spacing 256 between the shoulder belts 218, 220. By controlling the maximum spacing 256 between the shoulder belts 218, 220 proximate to the occupant's torso, the relative force applied to the occupant by either shoulder belt 218, 220 can be distributed more evenly to the occupant's body, decreasing focus pressure points and increasing comfort. In the illustrative embodiment, the sheath housing 238 defines the maximum spacing 256 to be equal to the maximum length 245 of the neck section 244. In some embodiments, the maximum spacing 256 defined by the openings 266 may be any spacing suitable for distributing the forces of the shoulder belts 218, 220 to the occupant's torso more evenly.

The shoulder belts 218, 220 are illustratively connected to the sheath housing 238 proximate to the ends 248, 250 of the neck section 244. In the illustrative embodiment, shoulder belt 218 is connected to the sheath housing 238 proximate to the end 248 of the neck section 244 and the shoulder belt 220 is connected to the sheath housing 238 proximate to the end 250 of the neck section 244. The sheath housing 238 is illustratively formed of a fabric and supports little compression but can withstand significant tension without substantial stretch. The sheath housing 238 defines a fabric spacing 256 between the shoulder belts 218, 220.

The upper sheath 234 includes a layer 258 that defines a pocket 260 for receiving the shoulder belts 218, 220. The layer 258 is illustratively attached to the outside of a front side of the sheath housing 238 along an inner periphery 262 and an outer periphery 264 of the sheath housing 38 to define the pocket 260 between the sheath housing 238 and the layer 258. The pocket 260 illustratively includes a pair of openings 266 and another pair of openings 268.

In the illustrative embodiment, the shoulder belts 218, 220, are wovenly connected to the sheath housing 238 through the pocket 260. Each opening 266 illustratively receives a respective one of the shoulder belts 218, 220 therethrough. One of the pair of openings illustratively positioned proximate to each end 254 of the respective arm section 246 and each opening 268 receives a respective one of the should belts 218, 220 therethrough. The pocket 260 illustratively extends between the openings 266 and the openings 268 for reception of the shoulder belts 218, 220 therethrough.

In the illustrative embodiment, each shoulder belt 218, 220 is connected to the sheath housing 238 by being threaded through the respective opening 266, pocket 260, and opening 268, without being fixed thereto, such that the sheath housing 238 can slide along the length of the shoulder belts 218, 220. Allowing the sheath housing 238 to slide along the shoulder belts 218, 220 provides good fit to the occupant and reduces friction against the occupant's body.

One of the openings 266 is illustratively positioned proximate to one end 248, 250 of the neck section 244 and the other opening 266 is positioned proximate to the other end 248, 250 of the neck section 244. The openings 266 illustratively include outer portions 267 that are spaced apart from each other by a maximum distance 269. The openings 266 receive the shoulder belts 218, 220 therethrough to define the maximum spacing 256 of the shoulder belts 218, 220 proximate to the occupant's torso to be equal to the maximum length 245 of the neck section 244.

The neck section 244 of the upper sheath 234 is adapted for contact with the occupant's neck. The neck section 244 illustratively includes edges 270 positioned along the inner periphery 262 that are shaped for contact with the occupant's neck. The edges 270 are illustratively made of microsuede to provide a comfortable contact interface with the occupant's body. In some embodiments, the edges 270 may be formed of any material suitable for contact with the occupant's body. In the illustrative embodiment, the sheath housing 238 has a U-shape, but in some embodiments may have any suitable shape for providing comfort to the occupant.

Unlike the illustrative embodiment of the restraint harness 10, the restraint harness 210 does not include a torso strap 72. It should be appreciated that in some embodiments, a torso strap may be included in the harness 210.

Each lower sheath 236 of the sheath assembly 224 illustratively includes a sheath housing 290. As described in additional detail below, each sheath housing 290 includes a cavity 292 defined therein and padding 294 within the cavity 292. One of the lower sheaths 236 is illustratively connected to each of the belt sections 226, 228 of the lap belt 222.

The sheath housing 290 of each of the lower sheaths 236 illustratively extends between an inner end 296 and an outer end 298. Each sheath housing 290 is illustratively shaped to a have a height h that is tapered proximate to each end 296, 298. The lower sheaths 236 are illustratively configured to engage each other by overlap at their inner ends 296.

The sheath housing 290 of each of the lower sheaths 236 includes a layer 200 that defines a pocket 202 for receiving the lap belt 226. The layer 200 is illustratively attached to the outside of a front side of the sheath housing 290 of each of the lower sheaths 236 along a periphery 204 of the sheath housing 290 to define the pocket 202 between the sheath housing 290 and the layer 200. The pocket 202 of each sheath housing 290 illustratively includes openings 206, 208.

The lap belt 222 is illustratively wovenly connected to the lower sheaths 236. Openings 206 of each of the lower sheaths 236 are configured to receive the respective belt sections 226, 228 therethrough to receive the lap belt 222 within the pockets 202. Openings 208 are illustratively configured to receive a respective one of the shoulder belts 218, 220 therethrough for attachment to a respective one of the belt sections 226, 228 of lap belt 222.

In the illustrative embodiment, a buckle 209 of each belt section 226, 228 is positioned at one of the openings 206 and is coupled to an end 212 of each respective belt section 226, 228. The end 212 of each of the belt sections 226, 228 is a free end that is slidably secured to the buckle 209 to permit adjustment of the lap belt 222 to the occupant. Each lower sheath 236 illustratively includes a belt loop 214 attached to a front side of layer 200 and configured to receive the free end 212 of the respective belt section 226, 228 therethrough to prevent flapping of the free end 212. The belt loop 214 is illustratively attached at the periphery 204 of the respective housing 290 to receive the free end 212 to be threaded between the belt loop 214 and the layer 200.

The housings 238, 290 of each of the upper and lower sheaths 234, 236 are illustratively embodied similar to the housings 38, 90 of restraint harness 10, as shown in FIG. 7, and include a front layer 116 and backing 118. The front layer 116 is illustratively formed of a woven nylon material. The backing 118 is illustratively formed of a breathable material such as, for example, a mesh fabric having a number of openings for med therein. The layers 258, 200 are illustratively formed of a nylon material and are attached to the periphery 262, 264, 204 of the respective housings 238, 290. It should be understood that in some embodiments, the housings 238, 290 of the respective upper and lower sheaths 234, 236 may be formed of any suitable materials and/or the sheaths 234, 236 may be formed of any combination of the same and/or different materials from each other.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure.

What is claimed is:

1. A restraint harness for securing an occupant within a vehicle, the restraint harness comprising:

a lap belt having a first end and a second end, each of the first and second ends being configured for attachment to the vehicle, the lap belt including a buckle positioned between the first and second ends,
a pair of shoulder belts that are moveable relative to each other, each shoulder belt having a vehicle end for attachment to the vehicle and extending therefrom to a belt end that is connected to the lap belt, and
a sheath assembly connected to the lap belt and the pair of shoulder belts, the sheath assembly comprising an upper sheath including a sheath housing defining an interior cavity and padding positioned within the interior cavity, the sheath housing including a neck section having a predetermined length and a pair of arm sections each having a first end attached to opposite ends of the neck section and extending therefrom in a direction parallel to each other to a second end,
wherein the sheath housing is connected to each of the shoulder belts proximate to the neck section to define a maximum spacing between the shoulder belts,
wherein the upper sheath includes an outer layer overlapping a front side of the sheath housing to define a pocket between the sheath housing and the outer layer for receiving at least one of the pair of shoulder belts therein, and
wherein the pocket includes a first pair of pocket openings arranged for receiving a first one of the pair of shoulder belts therethrough, and a second pair of pocket openings arranged for receiving a second one of the pair of shoulder belts therethrough.

2. The restraint harness of claim 1, wherein the maximum spacing is equal to the predetermined length.

3. The restraint harness of claim 1, wherein a first one of the first pair of pocket openings is disposed proximate to the first end of one of the arm sections, and wherein a first one of the second pair of pocket openings is disposed proximate to the first end of another one of the arm sections.

4. The restraint harness of claim 3, wherein the first one of the first pair of pocket openings and the first one of the second pair of pocket openings are spaced apart from each other at the predetermined length such that the maximum spacing between the shoulder belts at the first one of each pair of pocket openings is equal to the predetermined length.

5. The restraint harness of claim 3, wherein a second one of the first pair of pocket openings is disposed proximate to the second end of the one of the arm sections, and a second one of the second pair of pocket openings is disposed proximate to the second end of the another one of the arm sections.

6. The restraint harness of claim 1, wherein the outer layer is attached to the sheath housing proximate to each of an inner periphery and an outer periphery of the sheath housing to define the pocket for receiving at least one of the pair of shoulder belts.

7. The restraint harness of claim 1, further comprising a number of lower sheaths each including a lower sheath housing that defines an interior cavity and padding positioned within the interior cavity.

8. The restraint harness of claim 1, wherein the sheath body is U-shaped and the neck section of the sheath housing is adapted for contact the occupant's neck.

9. The restraint harness of claim 1, further comprising a torso strap connected at opposite ends thereof to each of the arm sections for securing the occupant's torso, the torso strap including a buckle positioned between the opposite ends thereof.

10. The restraint harness of claim 9, wherein each of the arm sections includes an adjustment strap connected thereto and extending along a length between the first and second ends of the respective arm section, and the opposite ends of the torso strap are each adjustably attached along the respective length of different ones of the adjustment straps.

11. The restraint harness of claim 9, wherein the torso strap includes elastic material biasing the torso strap to a shortened length, and non-elastic material defining a maximum length of the torso strap.

12. A sheath assembly for connection with an occupant restraint harness of a vehicle, the sheath assembly comprising:
a torso sheath configured to receive a pair of shoulder belts of the restraint harness, the torso sheath including a sheath body defining an interior cavity and padding positioned within the interior cavity, the sheath body including a neck contour having a predetermined length and a pair of arms each having a first end attached to opposite ends of the neck contour and extending therefrom in a direction parallel to each other to a second end, and
a number of waist sheaths configured to receive a lap belt of the restraint harness,
wherein the sheath body includes an outer cover overlapping a front side of the sheath body to define a closure between the sheath body and the outer layer, the closure having a pair of first openings disposed at the opposite ends of the neck contour and a pair of second openings each disposed proximate to the second ends of different ones of the arms, the pair of first openings defining a maximum distance therebetween.

13. The restraint harness of claim 12, wherein the sheath body is U-shaped and the neck contour is adapted for contact with the occupant's neck.

14. The restraint harness of claim 12, wherein the number of waist sheaths each include a sheath body that defines an interior cavity and padding positioned within the interior cavity.

15. The restraint harness of claim 14, wherein the number of waist sheaths each have a length defined between an inner end and an outer end, the inner ends each of the number of waist sheath being configured for overlapping engagement with each other, and a height of each of the number of waist sheaths is tapered proximate to the inner and outer ends.

16. The restraint harness of claim 12, further comprising a torso strap connected at opposite ends thereof to each of the arms for securing the occupant's torso, the torso strap includes a buckle positioned between the opposite ends thereof.

17. The restraint harness of claim 12, wherein the maximum distance is a distance defined between outer portions of the first openings.

18. A restraint system for securing an occupant within a vehicle, the restraint harness comprising:
an occupant seat having at least one opening defined therethrough proximate to the occupant's neck,
a lap belt having a first end and a second end, each of the first and second ends being configured for attachment to the vehicle, the lap belt including a buckle positioned between the first and second ends,
a pair of shoulder belts that are moveable relative to each other, each shoulder belt having a vehicle end for attachment to the vehicle and extending therefrom through the opening of the occupant seat to a belt end that is connected to the lap belt, a sheath assembly connected to the lap belt and the pair of shoulder belts, the sheath assembly comprising an upper sheath including a sheath housing defining an interior cavity and padding positioned within the interior cavity, the sheath housing including a neck section having a predetermined length and a pair of arm sections each having a first end attached to opposite ends of the neck section and extending therefrom in a direction parallel to each other to a second end, wherein the sheath housing is connected to each of the shoulder belts proximate to the neck section to define a maximum spacing between the shoulder belts, and wherein the sheath housing includes an outer cover overlapping a front side of the sheath housing to define a closure between the sheath housing and the outer layer, the closure having a pair of first openings disposed at the opposite ends of the neck section and a pair of second openings each disposed proximate to the second ends of different ones of the arm sections, the pair of first openings defining a maximum distance therebetween.

\* \* \* \* \*